UNITED STATES PATENT OFFICE.

FRANZ WEBEL, OF MANNHEIM, GERMANY, ASSIGNOR TO BADISCHE ANILIN & SODA FABRIK, OF LUDWIGSHAFEN-ON-THE-RHINE, GERMANY, A CORPORATION.

PRODUCING DIOLEFINS.

1,026,419. Specification of Letters Patent. Patented May 14, 1912.

No Drawing. Application filed January 30, 1912. Serial No. 674,418.

*To all whom it may concern:*

Be it known that I, FRANZ WEBEL, subject of the King of Bavaria, residing at Mannheim, Germany, have invented new and useful Improvements in Producing Diolefins, of which the following is a specification.

In the "*Journal für Praktische Chemie*", (2), vol. 55, page 5, Ipatieff has described the production of a particular diolefin, viz. of isoprene, by heating dibrom-isopentane with alcoholic potash. I have found, however, that I can obtain much better yields of diolefins by heating a monohalogen alkylene with a solid compound which is capable of splitting off halogen hydrid. The said solid compound may effect the splitting off of the halogen hydrid catalytically or by combining with the halogen hydrid. As instances of compounds which can be employed for thus splitting off halogen hydrid, I mention barium chlorid, nickel chlorid, lead chlorid, alumina and caustic lime. The reaction is preferably carried out by passing a monohalogen alkylene in the state of vapor through a tube or the like containing the heated solid reagent, and it is also advantageous to carry out the reaction under reduced pressure. The tube containing the barium chlorid or the like, may, for instance, be from about 1 to 3 yards in length.

The process of this invention is of particular advantage for the production of diolefins which can be employed in the production of artificial caoutchouc and similar bodies, for instance, diolefins which contain four, five, or six carbon atoms.

The following examples will serve to illustrate further the nature of my invention and how it can be carried into practical effect, but the invention is not confined to these examples. The parts are by weight.

Example 1: Pass vaporized 3-brom-2-methyl-butene-(2) $(CH_3)_2C=CBr-CH_3$, at a pressure of 20 millimeters, over caustic lime heated to from 500° to 520° C., whereupon dimethyl-allene, of a boiling point of from 38° to 41° C., is obtained, which, by the addition of hydro-bromic acid, is converted into 2.4-dibrom-2-methyl-butene of a boiling point of from 72° to 73° C., at a pressure of 16 millimeters.

Example 2: Pass vaporized 3-brom-2-methyl-butene-(2) over alumina at a pressure of from 20 to 30 millimeters and at from 450° to 500° C., whereupon pure isoprene can be obtained.

Now what I claim is:—

1. The process of producing diolefins by heating a monohalogen alkylene with a solid compound which is capable of splitting off halogen hydrid.

2. The process of producing diolefins by heating a monohalogen alkylene under reduced pressure with a solid compound which is capable of splitting off halogen hydrid.

3. The process of producing isoprene by heating 3-brom-2-methyl-butene-(2) with caustic lime.

4. The process of producing isoprene by heating 3-brom-2-methyl-butene-(2) with caustic lime under reduced pressure.

5. The process of producing isoprene by passing vaporized 3-brom-2-methyl-butene-(2) at a pressure of from 15 to 20 millimeters over caustic lime at a temperature of from 500° to 520° C.

In testimony whereof I have hereunto set my hand in the presence of two subscribing witnesses.

FRANZ WEBEL.

Witnesses:
A. O. TITTMANN,
J. ALEC. LLOYD.